INVENTOR.
ROBERT L. ARNTZ
BY
ATTORNEYS.

United States Patent Office 3,472,153
Patented Oct. 14, 1969

3,472,153
ELECTRIC FOOD COOKING DEVICE
Robert L. Arntz, Mansfield, Ohio, assignor to Dominion Electric Corporation, a corporation of Ohio
Filed Dec. 12, 1967, Ser. No. 689,911
Int. Cl. A47j 27/62, 37/08
U.S. Cl. 99—329                15 Claims

ABSTRACT OF THE DISCLOSURE

A toasting device for bread or the like in which the control of the toasting mechanism and the degree to which the bread or the like is subjected to toasting is determined by sensing means which sense approximately the temperature of the bread or the like and compensating means which sense approximately the ambient temperature in the toaster housing at a distance from the sensing means and bread and the like, which compensating means is subject to environmental factors tending to introduce errors in the sensing operation of the sensing means, which sensing means and compensating means together electrically control electrical responsive means which control the operation of the rack which carries the bread or the like between toasting and non-toasting positions and the operation of the switch which controls the energization of the electric resistance heating means of the toaster.

---

My invention relates to electric food cooking devices and particularly to electric toasters for bread and the like.

In the description of my invention, the same will be described in connection with a bread toaster as being particularly adapted for such use, but it will be appreciated that the invention and features thereof are adapted for other cooking devices and for cooking and toasting other foods than bread.

An object of my invention is to provide a food toaster controlled by the temperature of or at the food being toasted, with the electric signal transduced thereby being modified by the ambient temperature in the housing of the toaster, in such manner as to compensate this transduced signal due to environmental changes in the housing.

Another object is the provision for controlling the operation of a toaster in accordance with the temperature of the food or very closely adjacent or proximate to the food being toasted and with the ambient temperature of the air at a distance from the food.

Another object is to provide for improved control of the heating of food, such as bread, being subjected to heat generated by electrical resistance.

Another object is a novel provision for controlling the cooking or toasting cycle in accordance with preselected temperature of such food.

Another object is obtaining a toasting of bread or the like with greater speed than heretofore obtainable with the same or comparable amount of electrical energy, and with better results in obtaining the degree of brownness of the bread or the like being toasted.

Another object is the making of toasted bread or the like in which the toasting or browning of the exposed surface of the bread or the like is better and more evenly distributed.

Another object is the toasting of bread or the like to a more precise degree of toasting or browning desired and considering the temperature of the air in the toaster.

Another object is the provision of novel mechanism and control apparatus for a food cooking device, such as a bread toaster.

Another object is the provision of improved results with a unique structural arrangement and electrical control system in a food cooking device such as a bread toaster.

Other objects and a fuller understanding of my invention may be had by referring to the following description and claims, taken in conjunction with the accompanying drawings, in which:

Figure 1:
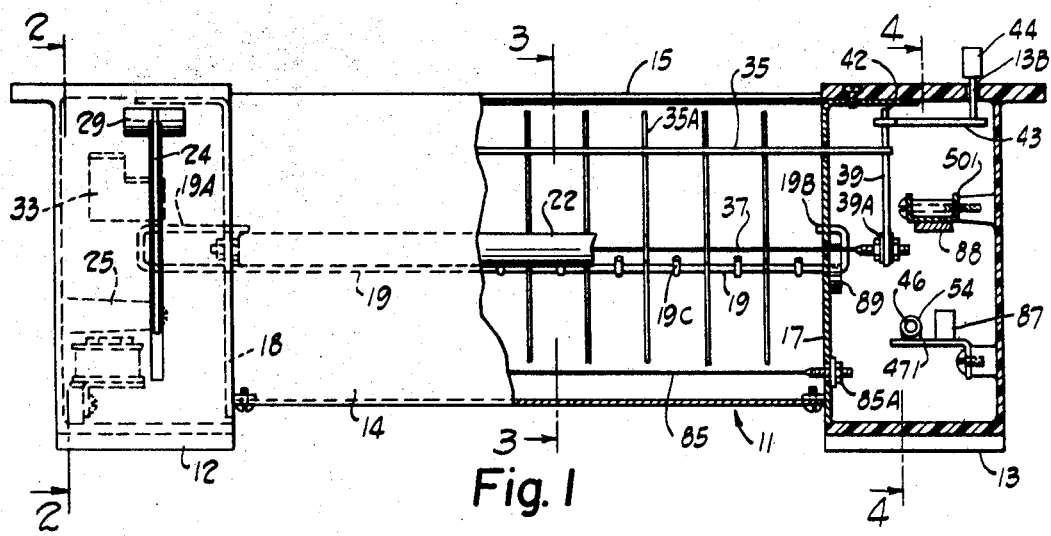
FIGURE 1 is a side view partially in section of an electrically heated bread toaster embodying a preferred form of my invention.

My improved toaster has a housing indicated generally by the reference character 11, of which a side view is shown in FIGURE 1. This housing 11 has one end member 12 positioned at one end and another end member 13 positioned at the opposite end. The end members 12 and 13 are preferably made of a molded plastic material which is both heat-insulating and electrical-insulating in character. Joining the spaced end members 12 and 13 is a metal shell 14. The metal shell 14 has side walls generally hyperbolic in cross-sectional shape.

Positioned within the shell 14 on opposite sides are two tubular electrical resistance members 22 and 23 intermediate the top and bottom of the side walls as illustrated, and also positioned with due regard to the practical maximum dimensions permitted in such a toaster. The inner surfaces of the side walls of the shell 14 are highly reflective so as to reflect infrared energy emitted from heating elements 22 and 23 inwardly of the shell. The lower ends of the side walls of the shell 14 are enclosed, except for a bottom opening (not shown) for the escape or discharge of crumbs therefrom.

Figure 3:
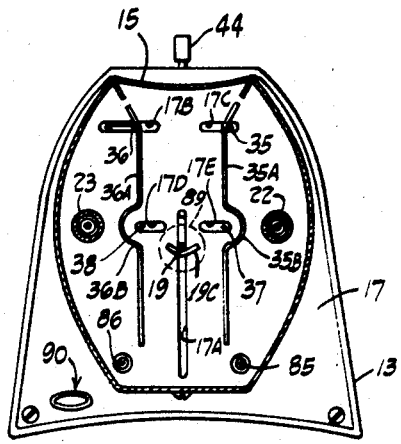
FIGURE 3 is a cross-sectional view taken through the line 3—3 of FIGURE 1.
Figure 4:
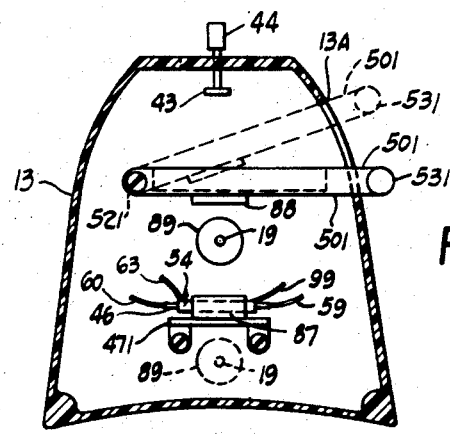
FIGURE 4 is a cross-sectional view taken through the line 4—4 of FIGURE 1.

The top of the shell member 14 is open for the insertion of slices of bread down into the toaster intermediate the side walls of the shell, that is into the well of the toaster. In the form shown, the toaster has room for two slices of bread arranged in tandem or alignment with opposite sides of each slice of bread exposed to infrared rays from the tubular electrical resistance elements 22 and 23. A cover 15 is hingedly connected by a hinge element to the spaced end members 12 and 13. When the toaster is not in use, the cover 15 may be swung downwardly in horizontal position as illustrated in FIGURE 3 so as to cover and enclose the top of the toaster and to keep dust and the like from entering the toaster. When the toaster is used, then the cover is swung upwardly and back on the hinge so as to hang downwardly outside of the shell 14.

Carried by the end members 12 and 13 are upright supporting panels 17 and 18, upright supporting panel 18 being carried by end member 12 and upright supporting panel 17 being carried by end member 13. The space between the panel members 17 and 18 and intermediate of the side walls of shell 14 provides the enclosure for the toasting or cooking operation. The elements 22 and 23 are sufficiently long as to extend substantially the length of the toaster between the panels 17 and 18 and thus to extend to or beyond the limits of the slices of bread in the toaster so as to assure full toasting treatment thereof.

The toaster has a bread-supporting rack 19 extending longitudinally thereof between panel members 17 and 18 and intermediate the side walls of shell 14. This rack 19 has a plurality of short cross-beams 19C disposed as shown for supporting the slices of bread thereon. The rack 19 has opposite bent end portions 19A and 19B provided for preventing rotation of the rack 19, that is, to assure against lateral tipping or rotation of the rack on its axis. The end portions of the longitudinal bar extending along rack 19 extend through vertical slots 17A and 18A in the panels 17 and 18. These aligned slots permit the rack member to move vertically upwardly and downwardly and also by accommodating the bent end portions 19A and 19B simultaneously prevent rotation of the rack member.

Mounted upon the long bar of rack 19 adjacent and outwardly of panel 17 so as to move up and down with the rack 19 is a permanent magnet 89 which operates to re-set a switch mechanism and hence is referred to as a reset magnet.

The tubular electrical resistance elements 22 and 23 are of the quartz of Vicor type, wherein a resistive wire is in the tube, which wire is resistant to electricity passing therethrough and which is so composed and constructed as to emit infrared energy therefrom around the circumferential extent of each tube and along the length thereof. Element 22 is secured by fastening means 22A to the panels 17 and 18 and element 23 is secured by fastening means 23A to panels 17 and 18 whereby the tubular elements 22 and 23 are mounted parallel to each other in a common horizontal plane and at the center of the approximate hyperbolic curves in which the side walls of the shell 14 are contoured.

Figure 2:
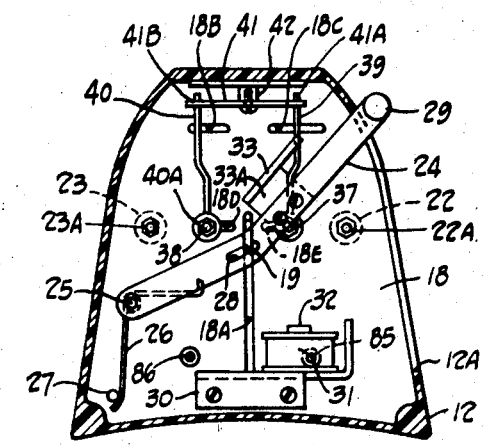
FIGURE 2 is a cross-sectional view taken through the line 2—2 of FIGURE 1.
Figure 5:
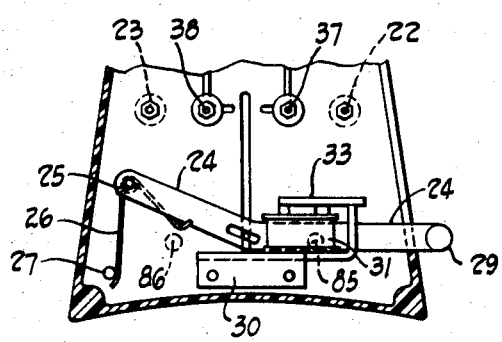
FIGURE 5 is a view somewhat similar to that of FIGURE 2 and showing the bread rack and release mechanism in their downward or toasting position whereas the rack and release mechanism are shown in their upward or non-toasting position in FIGURE 2.

Mounted within the end member 12 is a pivoted arm member 24. The arm member 24 is pivotally carried by the pivot support 25 so as to swing in an arc thereof, the arc being in an upright plane. A torsion spring 26 bearing on pivot support 25 intermediate its ends, and also bearing on the arm 24 and on an abutment 27 as illustrated in FIGURE 2, resiliently urges the arm member 24 upwardly to the position shown in FIGURE 2. However, the resiliency of spring 26 may be overcome so as to permit the arm 24 to be manually swung downwardly to the position illustrated in FIGURE 5. On the free end of the arm member 24, there is a handle 29 disposed outwardly of the end member 12 in a position to be manually seized and moved upwardly or downwardly by the operator. The arm member 24 extends through a longitudinal slit 12A formed in the side of the end member 12. Intermediate of the ends of the arm member 24 there is a slot 28 through which extends an end of rack 19 whereby raising and lowering of the arm member 24 in an arc also raises and lowers the rack 19 in a vertical plane. As the spring 26 urges the arm member 24 upwardly, it also resiliently urges the rack member 19 upwardly.

Mounted upon the end member 12 by means of an electrically insulated bracket support 30 is a release mechanism which is made up of a permanent magnet 32 encircled or surrounded concentrically by an electric coil 31. The face of the magnet 32 is disposed horizontally and directed upwardly. Carried upon the arm member 24 is an armature or soft iron keeper 33, the armature 33 being secured by a supporting bracket 33A bolted or otherwise secured to the arm member 24 as illustrated. The armature 33 is such as to be magnetically attracted to the magnet 32 and upon the arm member 24 being swung downwardly to its position shown in FIGURE 5, the magnetism of the magnet 32 magnetically retains the armature 33 in its downward position and hence holds the arm members 24 in its downward position, which in turn holds the rack 19 in its downward or toasting position. The polarity and magnetic strength of the magnet 32 are such as to firmly hold the armature 33 downwardly in contact with the magnet 32 against the bias of spring 26 otherwise urging the armature 33 on the arm member 24 upwardly. Although we prefer and show a permanent magnet, it is to be understood that the magnet 32 may be an electromagnet energized in a suitable and in a well-known manner from electric current which is supplied to the toaster, such as for the electrical heating of the bread.

The electric coil 31 is so disposed around the magnet 32 that upon the rectified electrical energization of the coil 31, the flux set up by the coil 31 overcomes or cancels out the magnetism of the magnet 32, or goes beyond the mere canceling out of the magnetism of the magnet 32 so as to reverse the polarity of the magnet 32. Thus, upon electrical energization of the coil 31, the magnet 32 no longer magnetically attracts and holds the armature 33 and so allows it to rise upwardly away from the magnet 32 in response to the resilient bias of the spring 26. Thus, also, the retention and release of the arm member 24, and hence of the rack 19, is dependent upon de-energization and energization of the coil 31. The arm member 24 may also be manually raised by sufficient force to overcome the magnetic attraction of the magnet 32.

Disposed on opposite sides of the rack 19 upon which the bread slices are supported are side guard members 35 and 36. These side guard members 35 and 36 are so disposed to be on the opposite sides of the parallel cut surfaces of the bread slices in the toaster, guard member 35 being on one side of a slice of bread and guard member 36 being on the other side of the slice of bread. These guard members 35 and 36 are made up of two parallel horizontal bars from which depend and vertically extend a plurality of rigidly attached upright portions. Attached to guard member 35 are a plurality of spaced upright portions 35A and attached to guard member 36 are a plurality of spaced upright portions 36A. The bond between the upright portions and the horizontal bars is such as to make a rigid interconnection therebetween. Intermediate the upper and lower ends of the upright portions 35A are bowed-out portions 35B. Also intermediate the upper and lower ends of the guard portions 36A are bowed-out portions 36B, as illustrated.

Rigidly connected to the opposite ends of the horizontal bar of guard member 35 are a pair of spaced upright supporting members 39. Rigidly joining the opposite ends of the horizontal bar of guard member 36 are spaced upright supporting members 40. The lower ends of the two upright supporting members 39 carry insulation mountings 39A which secure thereto a sensor wire 37 in such a manner as to hold said sensor wire 37 in a generally taut position and in a horizontal plane insulated from the guard member. The bowed-out portions 35B of guard member 35 accommodate the sensor wire 37 by extending therearound and out of contact with the wire 37. Carried by the lower ends of the upright supporting members 40 are mountings 40A which secure thereto a sensor wire 38 in such manner as to hold the said sensor wire 38 generally taut and in a horizontal plane. Again, the bowed-out portions 36B of guard member 36 accommodate the sensor wire 38 so as to be out of electrical contact therewith. In general, the sensor wires 37 and 38 are in the planes of the upright portions 35A and 36A, respectively, and are so arranged as to be in contact with or in very close proximity with the opposite surfaces of a slice of bread embraced by the guard members 35 and 36 when the guard members are moved bodily inward against or in very close proximity with the sides of the slices of bread. The sensor wires are so disposed as to assume or take on substantially the same temperature as the bread or the surface thereof being toasted between the guard members embracing the bread.

The upper ends of the supporting members 39 and 40 extend upwardly from the plane of the horizontal bars of guard members 35 and 36 and these upwardly protruding portions of supporting members 39 and 40 at each end of the toaster are joined by crossbars 41. The interconnection of the supporting members 39 and 40 with the crossbars 41 is such as to provide pivot connections 41A and 41B at the point of interconnection. It is thus seen in the drawings that the two guard members 35 and 36 with their opposite ends joined by the crossbars 41 form parallelograms. The horizontal bars of the guard members 35 and 36 are slightly bowed upwardly so as to maintain the sensor wires 37 and 38 under tension and hence straight even when the wires are expanded by heat.

Figure 6:
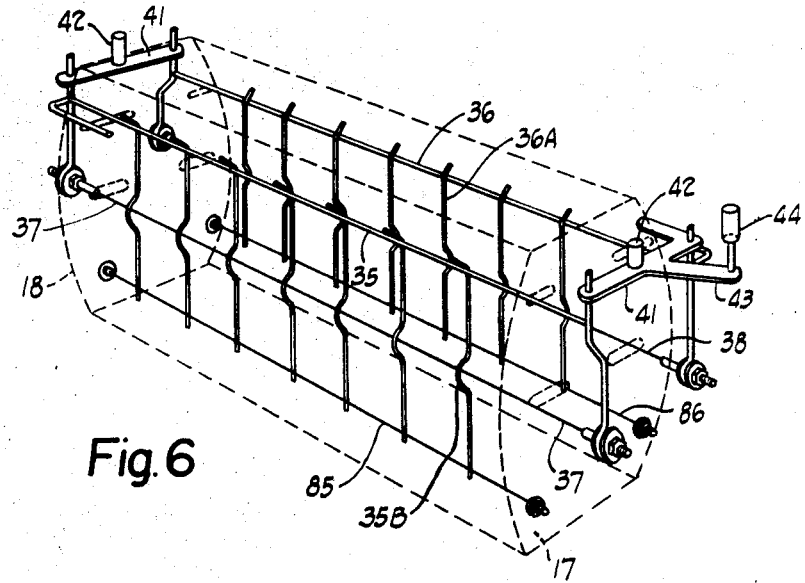
FIGURE 6 is a perspective view of the inner parts of the device shown in FIGURE 1 partially in phantom for better illustrating the arrangement of the parts.
Figure 7:
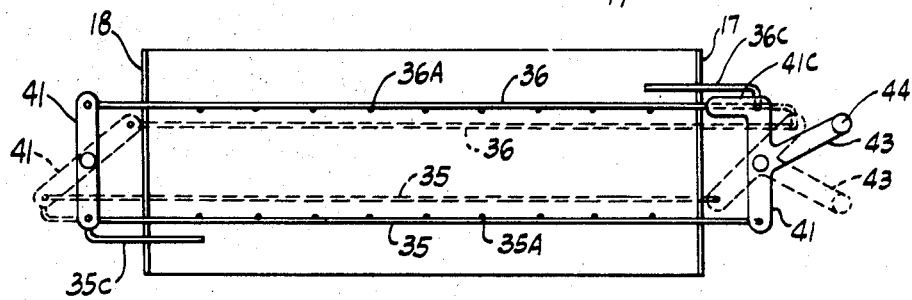
FIGURE 7 is a top plan view looking down on the view shown in FIGURE 6.

The crossbars 41 are pivotally connected and supported intermediate their ends by pivot supports 42 carried by the upper wall of the end members 12 and 13. By the swinging of the crossbars 41 upon pivot supports 42, the guard members 35 and 36 are simultaneously moved toward each other or away from each other in accordance with the angular disposition of the crossbars 41. One of the crossbars 41, which is at the right in FIGURES 1, 6 and 7, is modified from the crossbar 41 on the left in that there is an actuating portion 43 extending angularly therefrom. Protruding upwardly from the free end of the actuating portion 43 is a handle 44 which protrudes upwardly from the end member 13 through an arcuate slot 13B formed therein. By swinging the handle 44 in an arc between the two positions illustrated in FIGURE 7, the guard members 35 and 36 may be moved between the two extreme positions illustrated and in intermediate portions as desired. Thus, the guard members may be moved against or in very close proximity to the opposite sides of a slice of bread, the degree of movement required for this depending upon the thickness thereof. At the same time, the sensor wires 37 and 38 carried by the supporting members 39 and 40 of the respective guard members are moved with the guard members toward and away from the opposite sides of a slice of bread in the toaster. By the arrangement illustrated and described, the sensor wires may be so disposed as to assume or take on the same or approximately the same temperature as the slice of bread at the surface thereof as the sensor wires are either in engagement with the cut bread surface or in very close proximity therewith upon the guard members being moved inwardly against the bread on opposite sides thereof. The same right-hand crossbar 41 has a stop portion 41C extending therefrom for limiting movement of the said crossbar.

To accommodate the sensor wires 37 and 38 and to permit their movement in a horizontal plane toward and away from the bread, slots 17E and 17D are formed in panel member 17, and slots 18E and 18D are formed in panel member 18. Also to accommodate movement of the horizontal bars of guard members 35 and 36 in a horizontal plane toward and away from the bread, slots 17B and 17C are provided in panel member 17, and slots 18B and 18C are provided in panel member 18. The guard member 35 has a bent-over portion 35C in slot 18B to prevent rotation of guard member 35, and guard member 36 has a bent-over portion 36C in slot 17B of panel member 17 to prevent rotation of guard member 36.

Mounted within the end member 13 is a reed switch 46, which reed switch has one contact leaf 46A and another contact leaf 46B encased in a glass envelope or tube. The contact leaves 46A and 46B are resiliently biased away from each other so as to be in a normally open position, that is, in a position so as not to pass current therethrough. The contact leaves 46A and 46B or portions thereof are magnetic-responsive material so that they may flex or bend to closed position and to open position in response to magnetic attraction or repulsion appropriately oriented or directed. Thus, movement of the contact leaves 46A and 46B may be magnetically controlled from without the glass envelope around the switch 46. The switch 46 is mounted upon a bracket member 471 of electrical insulating material. The reed switch 46 is mounted in fixed horizontal position on the bracket 471 of insulating material. Wound in fixed position around the glass envelope of reed switch 46 is an electric coil 54 which upon energization creates a magnetic flux which thereby urges the contacts 46A and 46B into electrical engagement and thus closes switch 46.

Also mounted on the insulating member 471 is a small permanent magnet 87 closely adjacent to the reed switch 46 wound with coil 54 of appropriate magnetic strength so as to bias the switch 46 toward closed position, but not to close it. By means of the magnet 87, its strength and position, the sensitivity of the reed switch to move toward closed position may be predetermined and set.

Pivotally mounted upon the end member 13 by means of a pivot support 521 is a swingable arm member 501 so disposed as to extend outwardly of the member 13 through a longitudinal slot 13A. A handle 531 is carried on the free end of the arm member 501 so as to be seized by the operator and manually moved upwardly and downwardly to desired position. Mounted upon the arm 501 on its lower side is a permanent magnet 88 which is movable to adjustable position relative to reed switch 46 and coil 54, that is, so as to be spaced at selectively variable amounts and hence to selectively vary the magnetic force on the reed switch 46 by magnet 88 and to selectively adjust its responsiveness to the magnetic flux of coil 54. Swinging of handle 531 to desired position adjusts the position of this magnet, which in turn aids in adjusting the degree of darkness of the bread being toasted.

Connected to and extending between the panels 17 and 18, by means of insulated mountings 85A and 86A are a pair of compensator wires 85 and 86. These compensator wires 85 and 86, as shown, are parallel to sensor wires 37 and 38 but spaced as far from the sensor wires on the same respective side as possible and nevertheless so as to be within the housing and to be subjected to ambient temperature within the housing on opposite sides thereof. The compensator wires 85 and 86 are located close to the bottom of the housing and spaced both from the sensor wires 37 and 38 and from the bread receiving slot and the respective opposite sides of a slice of bread therein, so as to be as independent as possible of the then temperature of the bread but at the same time to be subjected to the general or average ambient temperature of the air in the housing on opposite sides thereof. This ambient temperature is dependent upon residual heat in the housing from previous toasting temperatures, upon heat then being generated within the housing, and upon room temperature.

The sensor wires 37 and 38 and compensator wires 85 and 86 are relatively fine or thin and preferably of nickel alloy and have the characteristic of having a relatively high resistance to flow of electricity therethrough at relatively high temperatures (such as a high temperature of bread upon being fully toasted and such as a high ambient temperature in the housing) and have a relatively low resistance to flow of electricity therethrough at low temperatures (such as room temperature of the temperature of bread before reaching full toasting temperature and such as a low ambient temperature in the housing). The amounts of flow of current through the sensor wires 37 and 38, and through compensator wires 85 and 86, are progressively dependent upon the respective temperatures of said wires 37 and 38, and 85 and 86. Both the material of the wires and the dimensions of wires 37 and 38, and wires 85 and 86, including the cross-sections thereof and the lengths thereof, affect how much the flow of electric current therethrough is modified by the respective temperatures of the sensor wires and compensator wires. These wires are selected of materials and dimensions at which the flow of current is relatively high and without much resistance thereto when the wires 37 and 38, and wires 85 and 86, are at room temperatures or at the temperatures of bread and of the air in the housing prior to toasting or in the initial stages of being toasted. The electrical resistance of the coil 54, preferably made of copper wire, is so selected by choice of material and dimensions, including cross-sectional area and length, that the resistance of the coil 54 is approximately equal to the output or resultant resistance of the described bridge circuit of wires 37, 38, 85 and 86 at the time of the "trip" or energization of coil 54 and closing of reed switch 46. There is provided a maximum power transfer from said bridge circuit to the land, that is, to coil 54. The ratio of the output or resultant resistance of said bridge circuit to the resistance of coil 54 is such that coil 54 is energized at the higher temperature ranges both of the toast and of the environment in the housing at a distance from the toast. Current is biased to flow through the sensor wires 37 and 38 and compensator wires 85 and 86 at room temperature or at the low temperatures of the initial stages of the toasting operation, but as temperature of the toast surface increases the sensor wires 37 and 38 increase in resistance and the said bridge circuit becomes unbalanced enough to cause sufficient current to flow through coil 54 to close switch 46.

Figure 8:
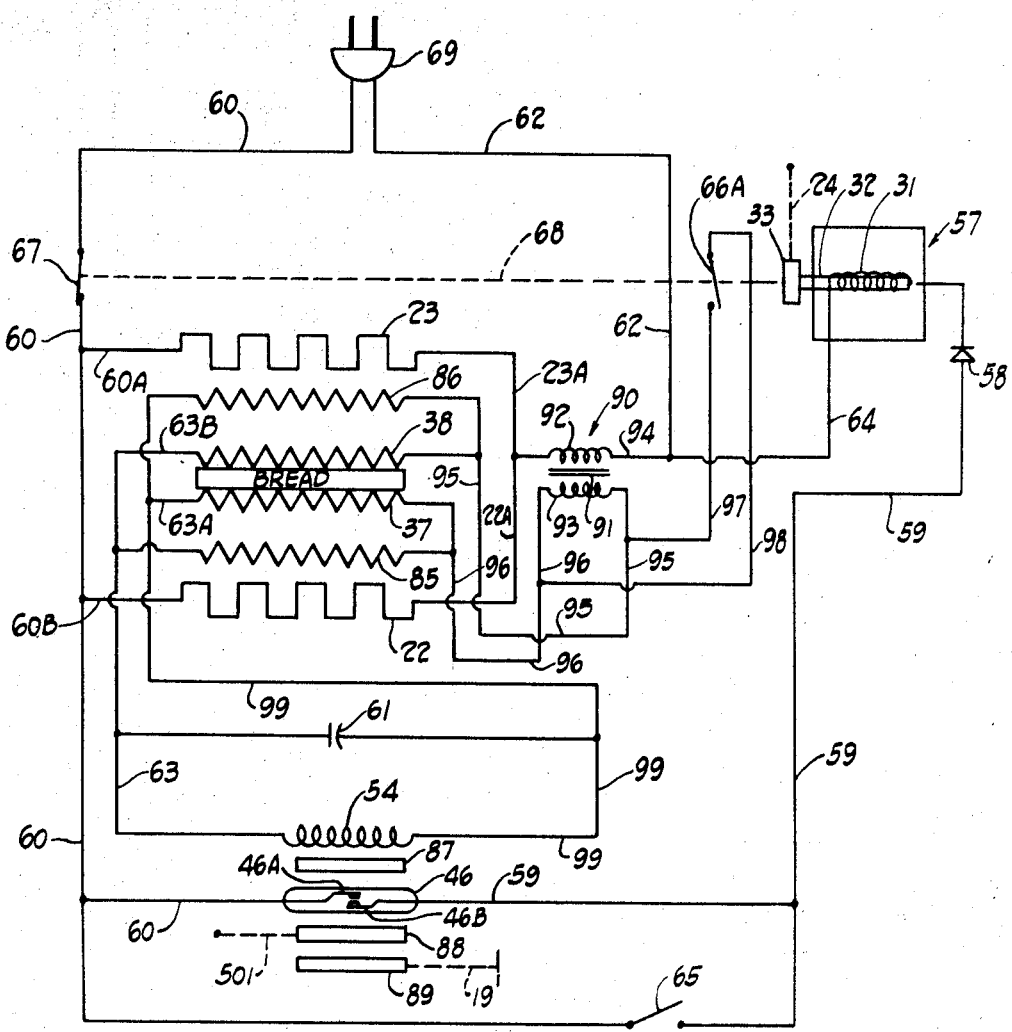
FIGURE 8 is a diagrammatic wiring circuit showing the electrical connections and arrangement of the device illustrated in FIGURE 1.

The electrical circuit including components of my improved toaster is diagrammatically shown in FIGURE 8. A connecting plug 69 is adapted to be connected to a suitable source of electrical energy, such as to the usual AC power line of a house. The current from the connecting plug or terminal 69 is carried by electric wire 60 and leads 60A and 60B tapped thereto to one end of each of the tubular electric resistance elements 23 and 22 as shown. The current from plug or terminal 69 is also carried by electric wire 62, through a lead 94 tapped to wire 62, through primary winding 92 of an isolating transformer 90, and through branch leads 23A and 22A to the opposite ends of the tubular electric resistance elements 23 and 22, respectively, as shown. Thus the heating elements 23 and 22 are connected in parallel and to a source of electric energy to be energized thereby, the current being conducted thereto through the one winding of a multiwinding transformer. The isolating transformer 90 also has a secondary winding 93 on its common core 91, whereby current is generated in winding 93 upon energization of winding 92, in the usual manner of electric transformers. There is no direct electric connection between the circuits connected to winding 92 and winding 93, and therefore the current through winding 92 and heating elements 22 and 23 is electrically isolated from the circuit connected to winding 93. Therefore, one accidentally touching, or receiving a current from, the circuit connected to winding 93 does not thereby receive the current through winding 92 and heating elements 22 and 23. The voltage induced in winding 93 is of the order of one volt or less and therefore is not a hazardous voltage in the isolated circuit. This is an important safety feature.

One end of secondary winding 93 is electrically connected through wire 95 and branch leads to one end each of sensor wire 38 and compensator 86 (the right hand ends in FIGURE 8), as shown. The other end of secondary winding 93 is electrically connected through wire 96 and branch leads to one end each of sensor wire 37 and compensator wire 85 (the right hand ends in FIGURE 8).

The opposite ends (left hand ends in FIGURE 8) of sensor wire 37 and compensator wire 86 are electrically connected to wire 99 through branch leads, which wire 99 is electrically connected as shown to one end (right hand ends in FIGURE 8) of coil 54 wound around reed switch 46.

The opposite ends (left hand ends in FIGURE 8) of sensor wire 38 and compensator wire 85 are electrically connected to wire 63 through branch leads, which wire 63 is electrically connected as shown to the opposite end (left hand end in FIGURE 8) of coil 54.

The sensor wires 37 and 38 and compensator wires 85 and 86 are thus connected as shown in a bridge circuit arrangement which bridge circuit arrangement is disposed to cause energization of coil 54 with current from secondary winding 93 of isolating transformer 90 in accordance with the resultant electrical resistance of the sensor and compensator wires in that arrangement at the then temperatures to which the sensor wires and compensator wires are subjected. As the temperature of the bread sensed by the sensor wires 37 and 38 may, and often would, vary from the ambient temperature of the air in the housing at a distance from the bread and sensed by compensator wires, the resistances offered at any one time by the sensor wires and compensator wire would differ. The resultant total resistance to flow of current through the coil 54 would thus be determined both by the temperature of the bread and the ambient temperature in the housing, this end or resultant resistance being determined or proportioned by the bridge arrangement described as in the usual bridge circuit of compared resistances.

In this manner the operation of coil 54 and hence of switch 46 is determined by temperature of the bread as modified by the ambient temperature, and by the ambient temperature as modified by the bread temperature. The resistances effected by these temperatures modulate each other to produce a result in operation of switch 46 which produces improved toasting operations. The ambient temperature in the housing is a result to some extent of prior toasting operations leaving residual heat in the toaster as well as the heat then being generated in the housing. The temperature of a piece of bread when first placed in the toaster is generally unrelated to the ambient temperature of the air then in the toaster housing. By taking into consideration both temperatures by means of the novel circuit and arrangement described, a better and more precise toasting of the bread to the required selected degree is obtained.

A capacitor 61 may be connected as shown between wires 63 and 99.

The sensitivity of the normally open switch 46 is adjusted to a degree by the magnetism and position of permanent magnet 87, which biases the switch toward, but not to, closing position. The sensitivity is set so that upon appreciable flow of current through coil 54 the switch 46 is magnetically closed by the magnetic flux generated by coil 54.

The sensitivity of the switch 46 is more finely adjusted at variable selected degrees of sensitivity by the movable magnet 88 carried by the pivoted arm 501 so as to be moved to positions at variable distances from switch 46. Depending upon the degree of darkness or brownness desired for the bread being toasted, the handle 531 on arm 501 is positioned so as to obtain the required degree of magnetic influence of magnet 88 on reed switch 46.

If dark toast is desired, the handle 531 is positioned so that switch 46 will not close until a relatively large amount of magnetic flux has been built up in coil 54, and hence to delay the closing of switch 46. If light colored toast is desired, the handle 531 is positioned to that switch 46 will close as a relatively smaller amount of magnetic flux has built up in coil 54, and this to accelerate the closing of switch 46. Of course, various degrees of darkness or lightness of the toast may be similarly obtained by varying the position of magnet 88, which magnet is thus referred to as the light-dark adjusting magnet and the handle 531 as the light-dark adjusting handle.

The reed switch 46 is magnetically re-set to open position by the upward movement of re-set magnet 89 on the end of rack 19 in its vertical path at the end of such toasting operation. After each toasting cycle has been completed and the switch 46 is then in its closed position, the upward movement of magnet 89 past and in proximity to the switch 46 magnetically opens, by separation of contacts 46A and 46B, the switch 46 so as to be in ready condition for the next toasting operation.

At lower temperatures of the sensor wires 37 and 38 and compensator wires 85 and 86 the current is biased to flow through the described bridge circuit of those wires 37, 38, 85 and 86 and not through coil 54.

Only when the temperatures to which the bridge circuit wires are subjected become sufficiently high will current flow through coil 54. The amount of current through the coil 54 increases with the increases in the temperatures to which the wires 37, 38, 85 and 86 of the bridge circuit are subjected.

To accommodate for transient current, that is a momentary surge in current through secondary winding 93 when operating switch 67 is closed to energize the heating elements 22 and 23 and primary winding 92, wire 97 is tapped to wire 95 where shown and wire 98 is tapped to wire 96 where shown. These wires are connected to opposite ends or leads of normally closed switch 66A. Thus, wires 97 and 98 when switch 66A is closed may short the circuit through wires 95 and 96.

A mechanical linkage 68, shown by broken lines in FIGURE 8, operatively interconnects the main circuit switch 67 in line 60 and switch 66A to operate them together, that is, to open switch 66A shortly after switch 67 is closed. The mechanical connection is such or the switches are constructed in such a manner that there is a lag or slight delay in the opening of switch 66A upon the closing of switch 67. Thus, for a very short time that switch 66A is closed after closing of switch 67, the momentary transient and undesired surge of current through wires 95 and 96 is shorted out by wires 97 and 98. Immediately thereafter, the switch 66A is opened, while switch 67 remains closed, and no current flows through wires 97 and 98 but may flow through the bridge circuit of wires 37, 38, 85, and 86.

The release mechanism indicated generally by the reference character 57 in FIGURE 8 includes the permanent magnet 32 encircled by the electric coil 31. A rectifier 58 is connected in the wire 59 so as to cause only direct current to flow through the coil 31 upon energization of the circuit. One end of the coil 31 is electrically connected with the wire 59 through the rectifier 58 and the other end of the coil 31 is electrically connected through a wire 64 to the wire 62. The armature or keeper 33 is positioned to be magnetically attracted and retained in position by the magnet 32 when the magnet 32 is so polarized or energized as to have magnetic attraction at the end facing the armature 33. The armature 33 is shown diagrammatically as being carried on the swingable arm 24. The mechanical linkage 68 is operatively interconnected to the armature 33 on arm 24 as well as with the two switches 66A and 67. When switch 67 is in closed position, the mechanical linkage 68 provides that the armature 33 is in its downward position shown in FIGURE 5 and which is the relative position illustrated diagrammatically in FIGURE 8. Thus, when the rack 19 is downward in toasting position and with the armature 33 retained downwardly by the magnet 32, the switch 67 is closed and current flows through the circuit, including the heating elements 22 and 23. However, upon the raising of the arm 24 and the upward movement of the armature 33, the switch 67 is simultaneously opened so as to de-energize the circuit including the heating elements. To manually energize the coil 31 and thus to change the polarity or the magnetic energization of the magnet 32, a manually operable switch 65 connected to by-pass reed switch 46 may be manually closed to cause current to flow through the coil 31 even though switch 46 may then be open.

To operate the toaster, the cut slices of bread may be dropped down through the open top of the toaster with the cover 15 swung back out of the way into the well of the toaster. The handle 29 is moved downwardly so as to cause the armature 33 to engage the magnet 32 and simultaneously to close the switch 67. Current then flows through the heating elements 22 and 23 to energize the same and as the sensor wires 37 and 38 the compensator wires 85 and 86 are at relatively low temperatures, this causes the current to flow through those wires rather than through the coil 54. To preselect or govern the point at which the energization of the coil 54 will cause the switch 46 to close and thus to automatically energize the coil 31, the position of the magnet 88 relative to switch 46 is adjusted by manipulation of the handle 531. It is understood, of course, that instead of changing the position of the magnet 88 relative to the switch 46, the reverse may be effected by having the switch 46 movable relative to magnet 88. Upon the relative positions of the magnet 88 and switch 46 being thus determined by the manipulation of handle 531, the toasting of the bread then down in toasting position within the toaster proceeds. Upon the temperature of the bread at its cut surfaces, then engaging the sensor wires 37 and 38 or in such very close proximity therewith as to have substantially the same temperature as the sensor wires 37 and 38 and upon the ambient temperature of the air about the compensator wires 85 and 86, reaching predetermined high degrees of temperature, then the flow of current is biased away from the bridge circuit of sensor wires 37 and 38 and compensator wires 85 and 86 to the coil 54. The resultant energization of the coil 54 sets up a magnetic flux which causes the actuation of the switch 46 at a point dependent upon its sensitvity as then determined by magnet 88 at its adjusted position. Upon coil 54 closing the switch 46, then the coil 31 about or encircling the magnet 32 is energized and this cancels the magnetic attraction of the magnet 32 by either completely de-energizing the same or by changing its polarity. The loss of magnetic attraction of the magnet 32 causes the armature 33 to swing upwardly on the arm 24 under the bias of spring 26. This raises the rack 19 from its lower or toasting position to its upper or non-toasting position and at the same time opens the switch 67 through the linkage 68. The bread at this termination of the toasting cycle has been toasted to the desired degree and may be removed from the toaster. The degree of toasting or browning of the bread may be closely regulated by changing the position of the handle 531. Those who prefer well browned toast will so set the handle 531 as to delay the closing of switch 46 by energization of coil 54 until the surface of the bread being toasted has reached a relatively high degree of temperature. Those desiring less browning of the toast will so adjust the position of the handle 531 and thus the point at which the switch 46 is closed by energization of coil 54 at a relatively lower range of temperature. Thus fine degrees of browning of the toast may be obtained by the setting of the control to handle 531.

By the use of our invention, bread or the like may be toasted faster, the toasting or browning more evenly distributed, and the toasting or browning done more precisely to the degree desired, than with the use of prior devices. The described objects of the invention are obtained with efficiency and economy.

The present disclosure includes that contained in the appended claims as well as that of the foregoing description.

Reference is herein made to United States patent application Ser. No. 523,221 of Earl E. Sutton and Terry M. Brain (issuing Dec. 19, 1967 as U.S. Patent No. 3,358,-584), and owned by the assignee of this application, for general information on the toaster structure except as otherwise disclosed in this application directed to this modified and improved toaster.

What is claimed is:

1. In a toaster for bread or the like having a rack movably mounted in a housing to move the bread or the like between toasting position and non-toasting position, the combination of electromagnetic means for holding the rack in toasting position in one condition of operation of the electromagnetic means and in a non-toasting position in another condition of operation of the electromagnetic means, electrical resistance heating means carried by said housing in position for toasting the bread or the like, electrical temperature sensing means disposed to sense temperature in said housing, a magnetically actuated electric switch for controlling the supply of current to said electromagnetic means and the actuation thereof, a switch-operating electric coil disposed relative to said electric switch for actuating the same by magnetic flux generated by said electric coil, an electric transformer having a primary winding and a secondary winding upon a core, first electric circuit means connecting said primary winding and said electrical resistance heating means in series and with a source of electrical energy to energize the said primary winding upon energization of the electrical resistance heating means, second electrical circuit means connecting said secondary winding, said electrical temperature sensing means and said switch-operating electric coil in series to energize said switch-operating electric coil with current generated in said secondary winding and conducted through said electrical temperature sensing means as determined by the electrical resistance of said electrical temperature sensing means, said electrical temperature sensing means having an electrical resistance increasing with the increase in degree of the temperature sensed, the energization of said switch-operating electric coil by the current generated in said secondary winding being in accordance with the current conducted through the switch-operating electric coil by said electrical temperature sensing means as determined by the then resistance of the electric temperature sensing means in relationship to the then resistance of the switch-operating electric coil.

2. The combination as claimed in claim 1 and in which said electric temperature responsive means includes first resistance means disposed adjacent the said rack in position to directly sense the temperature of said bread or the like carried by the rack and second resistance means positioned in said housing at a distance from said rack and from said first resistance means to sense ambient temperature in the housing and not as directly responsive to the temperature of the bread or the like as said first resistance means, said first and second resistance means and said switch-actuating electric coil being electrically connected in a bridge circuit arrangement to provide for the conducting of current through said switch-actuating electric coil in accordance with the resultant electrical resistance offered by said bridge circuit arrangement of said first and second resistance means, the value of said electrical resistance increasing with the increases in the temperatures sensed by said senso wires and compensator wires.

3. The combination claimed in claim 1 and in which said electric temperature responsive means includes a pair of sensor wires carried by the rack at opposite sides of the space therein for receiving bread or the like and positioned to directly sense the temperature of said bread or the like on opposite sides thereof, and includes a pair of compensator wires carried by the housing on opposite sides of said rack adjacent the bottom of the housing, each compensator wire being spaced from the rack and from the sensor wire on the same side to sense ambient temperature in the housing and in position to be not as directly responsive to temperature of the bread or the like as said sensor wires, the said sensor wires, compensator wires and said switch-operating electric coil being electrically connected in a bridge circuit arrangement to provide for the energization of the switch-operating electric coil in accordance with the ratio of electrical resistance values of said pair of sensor wires and said pair of compensator wires, said electrical resistance values increasing with the increases in the temperatures sensed by said sensor wires and compensator wires.

4. The combination claimed in claim 1 and including an adjusting magnet carried by the said housing and adjustably movable to selected positions relative to the position of said magnetically actuated electric switch to magnetically adjust the condition thereof at which said switch is actuable by said switch-operating electric coil.

5. The combination claimed in claim 1 and including a re-set magnet carried by said rack and movable with said rack in its travel between its said toasting and non-toasting positions, said re-set magnet being positioned to move in a path related to the position of said magnetically actuated electric switch so as to re-set the said electric switch to condition ready for successive actuation by the switch-operating electric coil upon the movement of the re-set magnet with the rack, to one of said toasting and non-toasting positions.

6. In an electric toaster for bread or the like having a housing, the housing having a slot opening into the housing for accommodating the bread or the like to be toasted, a rack for carrying the bread or the like between toasting position and non-toasting position, latch means for holding said rack in one of said positions, biasing means for biasing said rack toward the other of said positions, an electric circuit carried by the housing, and electrical heating means electrically connected to said circuit and carried by the housing in position to toast the bread or the like in toasting position in the slot, electrically responsive release means for releasing said latch means to cause the rack to be moved by said biasing means upon a predetermined degree of change in electric current supplied to said electrically responsive means, and switch means electrically connected to said circuit and to said release means to control the supply of current to said release means, the combination of a temperature sensor member carried by the housing in position to sense substantially directly the temperature of said bread or the like in the slot, a temperature compensator member carried by the housing in position substantially spaced from said slot and from said slot to sense the ambient temperature in said housing and only remotely the temperature of said bread or the like, electric control means for controlling the operation of said switch means to change the supply of current to said release means, an electric transformer having a primary winding and secondary winding, said primary winding being connected to said electrical circuit for the energization of the transformer, the said sensor member, said compensator member, and said electric control means being electrically interconnected, the electric resistances of said sensor member and said compensator member being substantially low at relatively low temperatures and substantially high at relatively high temperatures, said sensor member and compensator member being electrically interconnected so that the resistance of one modulates the resistance of the other and the resultant resistance to the flow of current from the said secondary winding to said electric control means as determined by the then temperatures sensed by the sensor member and compensator member, the degree of flow of current to said electric control means determining the control of said switch means.

7. The combination as claimed in claim 6 and in which said sensor member is comprised of a first portion disposed on one side of said rack to sense the temperature of one side of said bread or the like and a second portion disposed on the other side of said rack to sense the temperature of the other side of said bread or the like, in which said compensator member is comprised of a first portion disposed on one side of said rack within said housing at a distance from the first portion of the sensor member and a second portion disposed on the other side of said rack within said housing at a distance from the second portion of said sensor member, said portions of the sensor member and compensator member being elongated and extended substantially parallel to each other substantially the length of said slot, said first and second portions of the sensor member and compensator member being connected in a bridge circuit arrangement and to said electric control means and said secondary winding to provide for flow of current from said secondary winding to said electric control means in accordance with the resultant resistance provided by the electrical resistances of said portions connected in said bridge circuit arrangement.

8. The combination as claimed in claim 7 in which said switch means is magnetically responsive and is actuated by magnetic force, and in which said electric control means is an electric coil which generates magnetic flux in accordance with the flow of current through the electric coil, the electric coil being disposed relative to the switch means to actuate the switch means by the magnetic flux generated by said coil.

9. The combination as claimed in claim 8, and including an adjusting magnet movable to adjustable positions relative to said switch means and said electric coil to magnetically influence the same in accordance with the adjusted position of the adjusting magnet and to adjust the degree of responsiveness of the switch means to the magnetic flux generated by said electric coil.

10. The combination claimed in claim 8, and including a re-set magnet carried by the rack and movable therewith between toasting and non-toasting position, said re-set magnet being movable in a path so disposed relative to the position of the said switch means that the magnetic force of the re-set magnet in moving with the rack from toasting position to non-toasting position magnetically biases the switch means toward operating condition for the start of a toasting cycle.

11. In an electric toaster for bread or the like, the combination of a first electric circuit including electric heating means for toasting the bread or the like, a second electric circuit including electromagnetic means for governing the movement of the bread or the like between toasting and non-toasting positions and electric control means for controlling the electromagnetic means, a third circuit for controlling the operation of said electric control means in response to then temperature conditions in the toaster, and an electric transformer connected to be energized by current in said first circuit and upon energization in said third circuit, said first and third circuits being electrically isolated by said transformer.

12. The combination as claimed in claim 11, and in which said third circuit includes first temperature responsive means disposed to sense the then temperature of bread or the like in said toaster and second temperature responsive means disposed to sense the then ambient temperature in the toaster at a distance from the first temperature responsive means, said first and second temperature responsive means together effecting the operation of said electric control means.

13. The combination as claimed in claim 12 and in which said first temperature responsive means includes first and second resistance elements, said second temperature responsive means includes first and second resistance elements, said four resistance elements being connected in a bridge circuit arrangement connected in series within said third circuit to control the flow of current in the third circuit in accordance with the resultant resistance offered by the bridge circuit arrangement.

14. The combination as claimed in claim 11 in which said second circuit includes magnetic flux generating means, and in which said electric control means includes a magnetically responsive reed switch positioned to be magnetically actuated by said magnetic flux generating means and including magnetic adjusting means for selectively varying the sensitivity of the reed switch to operation by said magnetic flux generating means.

15. The combination as claimed in claim 14 and including a re-set magnet automatically movable in the toaster upon completion of each toasting operation and having a magnetic strength and path of travel to re-set the said reed switch to open position upon the completion of each toasting operation.

References Cited

UNITED STATES PATENTS

| | | | |
|---|---|---|---|
| 2,194,859 | 3/1940 | Malmquist et al. | 99—328 |
| 2,355,153 | 8/1944 | Gomersall | 99—391 |
| 2,491,829 | 12/1949 | Palmer et al. | 99—391 |
| 2,597,023 | 5/1952 | Olving | 99—326 |
| 2,865,279 | 12/1958 | Palmer | 99—329 |
| 2,910,929 | 11/1959 | Sorenson | 99—390 |

BILLY J. WILHITE, Primary Examiner

U.S. Cl. X.R.

99—331, 337, 391